(12) United States Patent
Tonokawa et al.

(10) Patent No.: US 11,245,113 B2
(45) Date of Patent: Feb. 8, 2022

(54) SECONDARY BATTERY

(71) Applicant: Kabushiki Kaisha Nihon Micronics, Tokyo (JP)

(72) Inventors: Takashi Tonokawa, Aomori (JP); Yutaka Kosaka, Aomori (JP); Kazuyuki Tsunokuni, Aomori (JP); Hikaru Takano, Tokyo (JP); Shigefusa Chichibu, Miyagi (JP); Kazunobu Kojima, Miyagi (JP)

(73) Assignee: Kabushiki Kaisha Nihon Micronics, Musashino (JP)

( * ) Notice: Subject to any disclaimer, the term of this patent is extended or adjusted under 35 U.S.C. 154(b) by 352 days.

(21) Appl. No.: 16/286,362

(22) Filed: Feb. 26, 2019

(65) Prior Publication Data

US 2019/0190024 A1   Jun. 20, 2019

Related U.S. Application Data

(63) Continuation of application No. PCT/JP2017/026697, filed on Jul. 24, 2017.

(30) Foreign Application Priority Data

Aug. 31, 2016  (JP) .............................. JP2016-168956

(51) Int. Cl.
*H01M 4/52*  (2010.01)
*H01M 10/38*  (2006.01)
(Continued)

(52) U.S. Cl.
CPC ............. *H01M 4/523* (2013.01); *H01M 4/52* (2013.01); *H01M 4/624* (2013.01); *H01M 10/36* (2013.01); *H01M 10/38* (2013.01)

(58) Field of Classification Search
None
See application file for complete search history.

(56) References Cited

U.S. PATENT DOCUMENTS

| 8,004,737 B2 | 8/2011 | Nakazawa |
| 9,887,441 B2 | 2/2018 | Nakazawa |

(Continued)

FOREIGN PATENT DOCUMENTS

| CN | 107431165   | * 12/2017 | .......... H01M 50/431 |
| CN | 107431165 A | * 12/2017 | .......... H01M 50/431 |

(Continued)

*Primary Examiner* — Kaity V Chandler
(74) *Attorney, Agent, or Firm* — Lorenz & Kopf, LLP

(57) ABSTRACT

A secondary battery includes: a first oxide semiconductor having a first conductivity type; a first charging layer disposed on the first oxide semiconductor layer, and composed by including a first insulating material and a second oxide semiconductor having the first conductivity type; a second charging layer disposed on the first charging layer; a third oxide semiconductor layer having a second conductivity type disposed on the second charging layer; and a hydroxide layer disposed between the first charging layer and the third oxide semiconductor layer, and containing a hydroxide of a metal constituting the third oxide semiconductor layer. The highly reliable secondary battery is capable of improving an energy density and increasing battery characteristics (electricity accumulation capacity).

19 Claims, 11 Drawing Sheets

(51) Int. Cl.
*H01M 4/62* (2006.01)
*H01M 10/36* (2010.01)

(56) References Cited

U.S. PATENT DOCUMENTS

| | | | | |
|---|---|---|---|---|
| 10,141,562 | B2 * | 11/2018 | Hirose | H01M 50/116 |
| 2008/0131778 | A1 * | 6/2008 | Watanabe | H01M 4/0471 |
| | | | | 429/220 |
| 2010/0330410 | A1 * | 12/2010 | Takahashi | H01M 4/62 |
| | | | | 429/129 |
| 2011/0281167 | A1 * | 11/2011 | Sabi | H01M 10/0525 |
| | | | | 429/221 |
| 2012/0258351 | A1 * | 10/2012 | Saka | C01G 53/50 |
| | | | | 429/144 |
| 2013/0189562 | A1 | 7/2013 | Dolle et al. | |
| 2013/0224596 | A1 | 8/2013 | Nakazawa | |
| 2013/0276878 | A1 | 10/2013 | Nakazawa | |
| 2014/0335395 | A1 * | 11/2014 | Ramasubramanian | |
| | | | | H01M 4/139 |
| | | | | 429/142 |
| 2014/0352775 | A1 | 12/2014 | Kudoh et al. | |
| 2015/0192611 | A1 | 7/2015 | Dewa et al. | |
| 2015/0270329 | A1 | 9/2015 | Sagara et al. | |
| 2016/0028064 | A1 * | 1/2016 | Choi | H01M 10/0583 |
| | | | | 429/145 |
| 2016/0149268 | A1 * | 5/2016 | Fan | H01M 4/13 |
| | | | | 429/50 |
| 2016/0149269 | A1 * | 5/2016 | Fan | H01M 4/4235 |
| | | | | 429/50 |
| 2016/0240845 | A1 * | 8/2016 | Fujinoki | H01M 4/523 |
| 2017/0084925 | A1 * | 3/2017 | Yoshii | H01M 4/663 |
| 2018/0294475 | A1 * | 10/2018 | Zhamu | H01M 10/054 |

FOREIGN PATENT DOCUMENTS

| | | | | |
|---|---|---|---|---|
| JP | 2008282633 | A | 11/2008 | |
| JP | 2013519990 | A | 5/2013 | |
| JP | 5297809 | B2 | 9/2013 | |
| JP | 5508542 | B2 | 6/2014 | |
| JP | 2015082445 | A | 4/2015 | |
| JP | 2015195335 | A | 11/2015 | |
| JP | 2016082125 | A | 5/2016 | |
| KR | 20140009978 | A | 1/2014 | |
| WO | WO2012046326 | A1 | 4/2012 | |
| WO | WO2013065093 | A1 | 5/2013 | |
| WO | WO2013179471 | A1 | 12/2013 | |
| WO | WO-2016205663 | * | 12/2016 | H01M 10/049 |
| WO | WO-2016205663 | A1 * | 12/2016 | H01M 10/049 |
| WO | WO 2016208116 | * | 12/2016 | |
| WO | WO-2016208116 | A1 * | 12/2016 | H01L 49/00 |

* cited by examiner

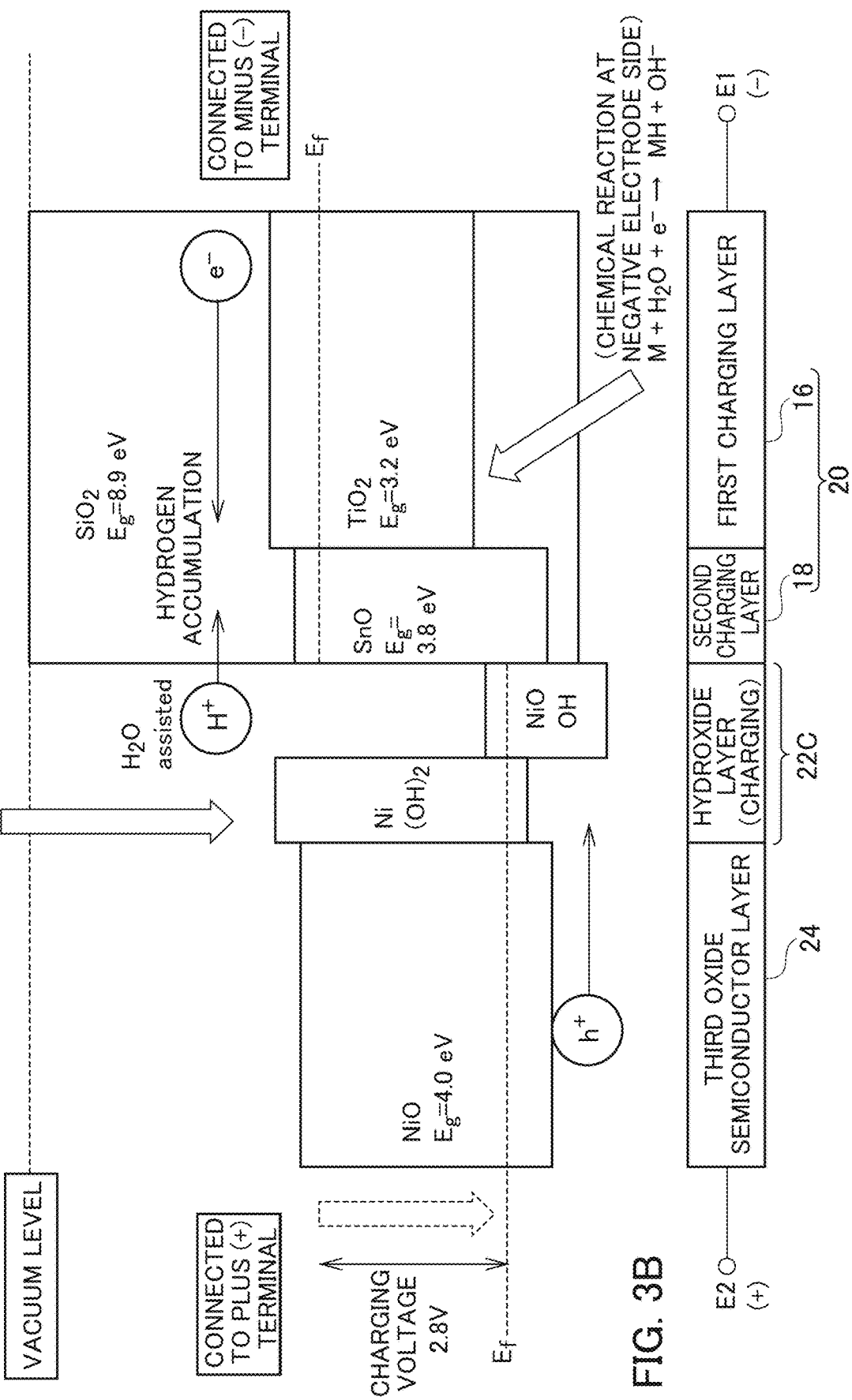

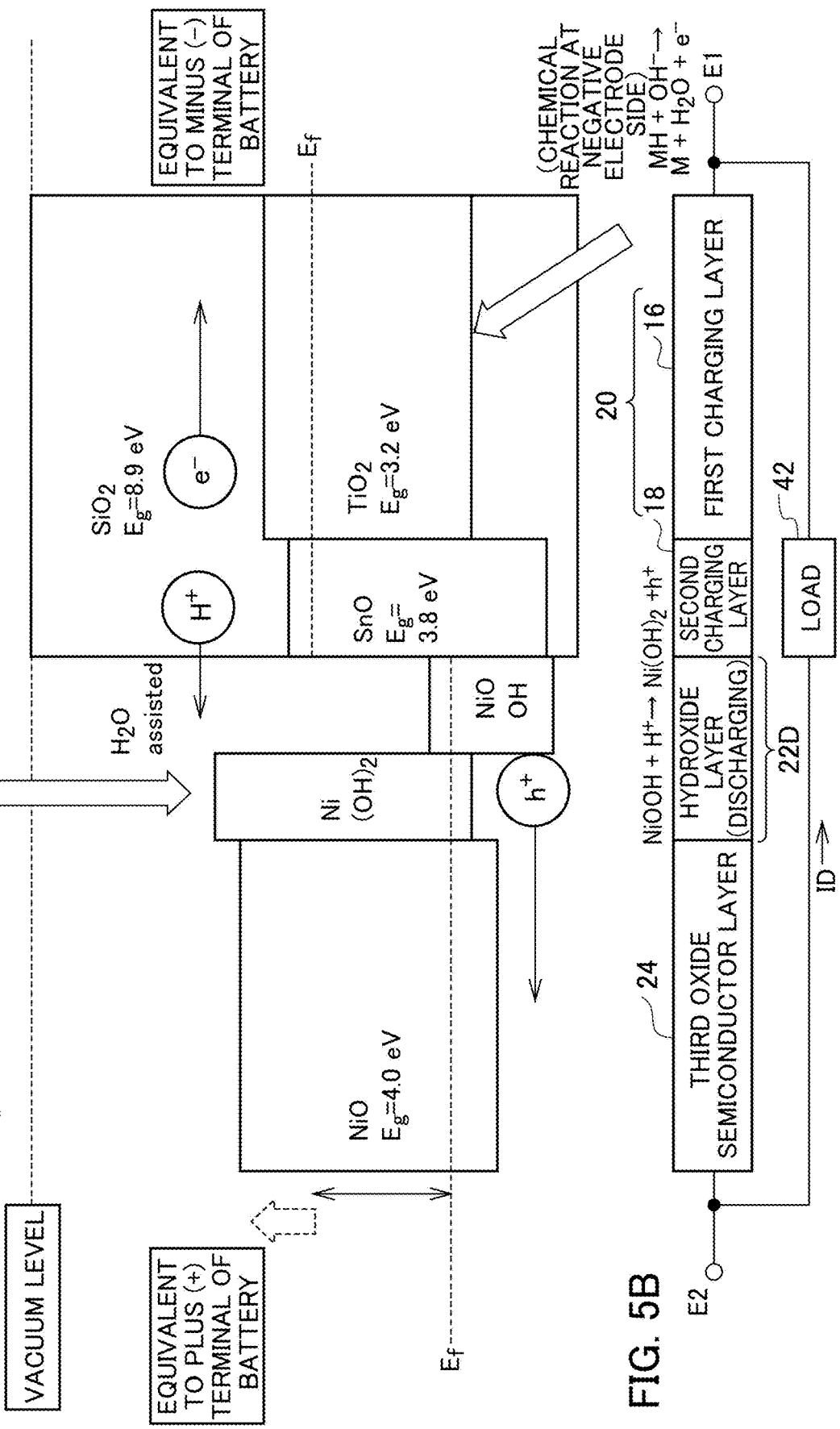

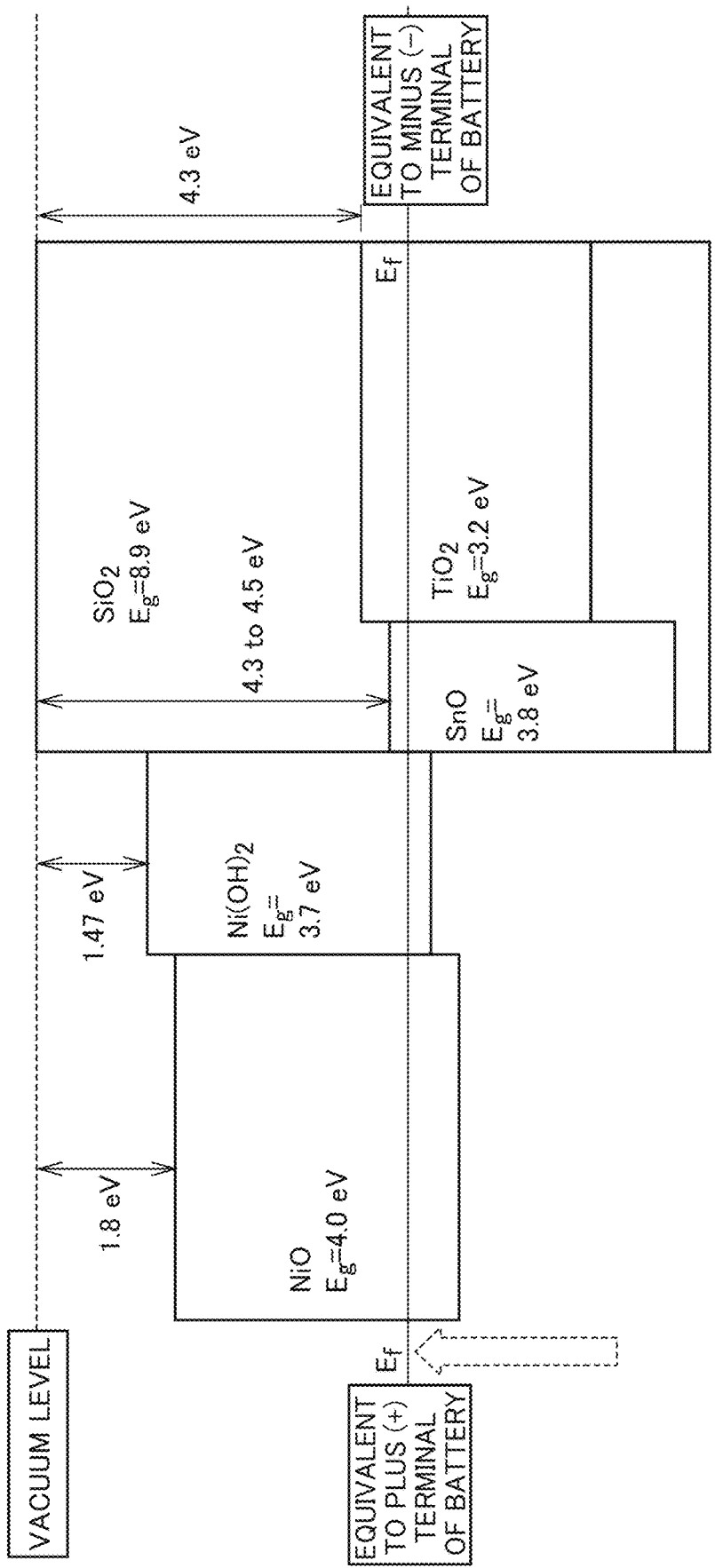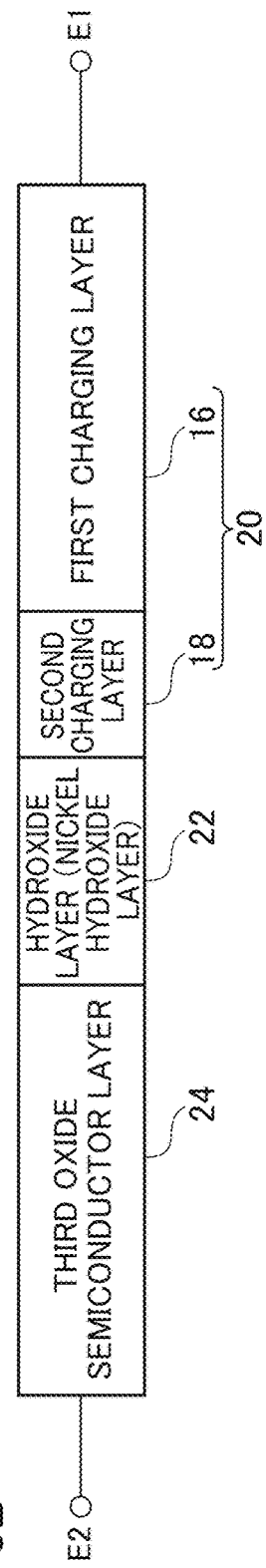
FIG. 6A
FIG. 6B

SECONDARY BATTERY

CROSS-REFERENCE TO PRIORITY APPLICATION

This application is a continuation of international patent application number PCT/JP2017/026697, having an international filing date of Jul. 24, 2017, which claims priority to Japanese patent application number JP 2016-168956, having a filing date of Aug. 31, 2016. The content of the referenced applications is incorporated by reference herein.

TECHNICAL FIELD

The embodiments described herein relate to a secondary battery.

BACKGROUND

As conventional secondary batteries, there have been proposed secondary batteries, in which a first electrode/an insulating material/an n type oxide semiconductor layer/a p type oxide semiconductor layer/a second electrode are layered, since electrolytic solutions and rare elements are not used and thinning thereof can be realized.

Moreover, as a structure similar to such secondary batteries, there have been proposed secondary batteries including: a positive electrode including a positive-electrode active material layer containing a nickel oxide or the like as a positive-electrode active material; a solid electrolyte having an aqueous porous structure; and a negative electrode including a negative-electrode active material layer containing a titanium oxide or the like as a negative-electrode active material.

SUMMARY

The embodiments provide a highly reliable secondary battery capable of improving an energy density and increasing battery characteristics (electricity accumulation capacity).

According to one aspect of the embodiments, there is provided a secondary battery comprising: a first oxide semiconductor having a first conductivity type; a first charging layer disposed on the first oxide semiconductor layer, the first charging layer composed by comprising a first insulating material and a second oxide semiconductor, the second oxide semiconductor having the first conductivity type; a third oxide semiconductor layer having a second conductivity type disposed on the first charging layer; and a hydroxide layer disposed between the first charging layer and the third oxide semiconductor layer, the hydroxide layer containing a hydroxide of a metal constituting the third oxide semiconductor layer.

According to the embodiments, there can be provided the highly reliable secondary battery capable of improving the energy density and increasing the battery characteristics (electricity accumulation capacity).

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3A is an energy band diagram during charging (forward bias state) of the secondary battery according to the embodiments.

FIG. 3B is a schematic configuration diagram of each layer corresponding to FIG. 3A.

FIG. 5A is an energy band diagram in a discharged state (state connected to a load) of the secondary battery according to the embodiments.

FIG. 5B is a schematic configuration diagram of each layer corresponding to FIG. 5A.

FIG. 6A is an energy band diagram in a fully discharged state of the secondary battery according to the embodiments.

FIG. 6B is a schematic configuration diagram of each layer corresponding to FIG. 6A.

DETAILED DESCRIPTION

Next, the embodiments will be described with reference to drawings. In the description of the following drawings, the identical or similar reference sign is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation. Of course, the part from which the relation and ratio of a mutual size differ also in mutually drawings is included.

Moreover, the embodiments shown hereinafter exemplify the apparatus and method for materializing the technical idea; and the embodiments do not specify the material, shape, structure, placement, etc. of each component part as the following. The embodiments may be changed without departing from the spirit or scope of claims.

Figure 1:
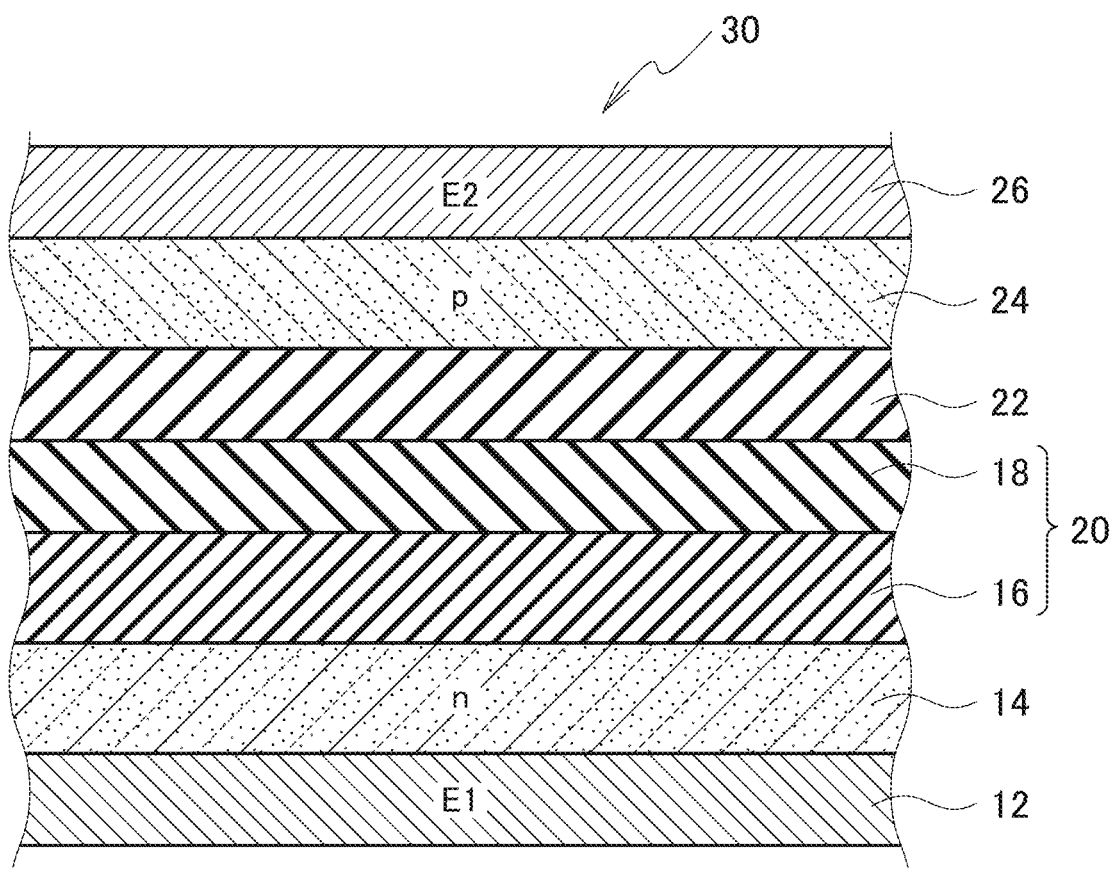
FIG. 1 is a schematic cross-sectional structure diagram showing a secondary battery according to the embodiments.

FIG. 1 shows a schematic cross-sectional structure of a secondary battery according to the embodiments. Hereinafter, a secondary battery 30 according to the embodiments will be explained.

As shown in FIG. 1, the secondary battery 30 according to the embodiments includes: a first oxide semiconductor 14 having a first conductivity type; a first charging layer 16 disposed on the first oxide semiconductor layer 14, and composed by including a first insulating material and a second oxide semiconductor having the first conductivity type; a third oxide semiconductor layer 24 having a second conductivity type disposed on the first charging layer 16; and a hydroxide layer 22 disposed between the first charging layer 16 and the third oxide semiconductor layer 24, and containing a hydroxide of a metal constituting the third oxide semiconductor layer 24.

Moreover, the secondary battery 30 according to the embodiments may include a second charging layer 18 disposed between the first charging layer 16 and the hydroxide layer 22, as shown in FIG. 1.

In the embodiments, the second charging layer 18 may include a second insulating material.

Alternatively, the second charging layer 18 may include the second insulating material and a conductivity adjusting material.

Alternatively, the first charging layer 16 may include a structure of at least two-layer of which compositions are different from each other. The first charging layer 16 may be formed by including a silicon oxide ($SiO_2$)/a titanium oxide ($TiO_2$), for example. Specifically, the first charging layer 16 may be formed by including a layered structure of $SiO_2$/$TiO_2$, or may be formed by including a particulate bonding structure in which the periphery of particle-shaped $TiO_2$ is covered with $SiO_2$. Alternatively, the first charging layer 16 may include a structure into which $TiO_2$ and $SiO_2$ are mixed, or a structure in which $TiO_2$ is wrapped in a silicon oxide. In the above description, the compositions of the titanium oxide and the silicon oxide are respectively not limited to $TiO_2$ and $SiO_2$, but may include a structure in which the composition ratio x, of $TiO_x$ and/or $SiO_x$ is changed.

Moreover, the n type oxide semiconductor may be an oxide of titanium (Ti), tin (Sn), zinc (Zn), or magnesium (Mg). Accordingly, the first charging layer 16 may be a layered structure of $SiO_2$ and an oxide of with Ti, Sn, Zn, or Mg, or may be formed of a particulate bonding structure in which the periphery of an oxide of particle-shaped Ti, Sn, Zn, or Mg is covered with $SiO_2$. Alternatively, the first charging layer 16 may include a configuration in which a molecule or molecular group of $SiO_2$ and an oxide of Ti, Sn, Zn, or Mg is surrounded by $SiO_2$ (amorphous).

Alternatively, the first charging layer 16 may include a porous structure.

Moreover, the second oxide semiconductor may include at least one oxide selected from the group consist of an oxide of Ti, an oxide of Sn, an oxide of Zn, and an oxide of Mg.

Moreover, the conductivity adjusting material may include an oxide of a semiconductor having the first conductivity type or an oxide of a metal. Alternatively, the conductivity adjusting material may include at least one oxide selected from the group of consisting of an oxide of Sn, an oxide of Zn, an oxide of Ti, and an oxide of niobium (Nb).

More specifically, the second insulating material may include $SiO_2$ and the conductivity adjusting material may include $SnO_x$, in the secondary battery 30 according to the embodiments.

Alternatively, the second insulating material may include $SiO_x$ formed as a film from silicone oil, in the secondary battery 30 according to the embodiments.

Alternatively, the first insulating material may include $SiO_2$ and the second oxide semiconductor may include $TiO_2$, in the secondary battery 30 according to the embodiments.

Hydroxide Layer

The hydroxide layer 22 is a layer which reduces a metal hydroxide and converts an electron hole ($h^+$) into a hydrogen ion ($H^+$) by an application of an electric field at the time of charging, and converts the hydrogen ion into the electron hole at the time of discharging.

If the hydroxide is a nickel hydroxide, the following reaction formula is realized.

Nickel Hydroxide Layer

The nickel hydroxide ($Ni(OH)_2$) is changed to a nickel oxyhydroxide (NiOOH) by the applications of the electric field. A reaction of $Ni(OH)_2 + h^+ \rightarrow NiOOH + H^+$ progresses at the time of charging, and a reaction of $NiOOH + H^+ \rightarrow Ni(OH)_2 + h^+$ progresses at the time of discharging. The aforementioned reaction causes electrochromism.

First Charging Layer

The first charging layer 16 is a layer which is paired with the hydroxide layer 22 and accumulates hydrogen generated at the time of charging. In the first charging layer 16, a reaction of $M + H_2O + e^- \rightarrow MH + OH^-$ progresses at the time of charging, and a reaction of $MH + OH^- \rightarrow M + H_2O + e^-$ progresses at the time of discharging. If the first charging layer 16 is made porous, efficiency of accumulating the hydrogen can be increased. Moreover, the hydrogen accumulation and electrical conductivity can be optimized if the first charging layer 16 is formed as a plurality of layers. It can be optimized by forming the second oxide semiconductor by using an oxide of Ti, Sn, Zn or Mg.

Second Charging Layer

The second charging layer 18 is a buffer layer for adjusting movement of $H^+$ and electrons ($e^-$). The mobility of $H^+$ and $e^-$ can be further adjusted by adding a conductivity adjusting material. The second charging layer 18 can be thickly formed in a high breakdown voltage electrically by using an oxide of Sn, Zn, Ti, or Nb for the conductivity adjusting material.

P type Oxide Semiconductor Layer

The oxide semiconductor layer 24 constitutes a pn junction with respect to the n type semiconductor of the hydroxide layer (NiOOH of the nickel hydroxide layer), and can suppress an electric charge leak at the time of charging. If the p type oxide semiconductor layer 24 is formed by using NiO, it is possible to form $Ni(OH)_2$ layer by electrical stimulation.

N type First Oxide Semiconductor Layer

The n type first oxide semiconductor layer 14 has an electric resistance intermediate between a first electrode 12 and a first charging layer 16, and makes electrical bonding smooth.

As shown in FIG. 1, the secondary battery 30 according to the embodiments may include the first electrode 12 and the second electrode 26; the first oxide semiconductor layer 14 may include an n type first oxide semiconductor layer, and may be connected to the first electrode 12; the second oxide semiconductor may include an n type second oxide semiconductor; and the third oxide semiconductor layer 24 may include a p type third oxide semiconductor layer, and may be connected to the second electrode 26.

Further in details, the third oxide semiconductor layer 24 may include a nickel oxide (NiO), and the hydroxide layer 22 may include at least any one of a nickel hydroxide ($Ni(OH)_2$) or nickel oxyhydroxide (NiOOH), in the secondary battery 30 according to the embodiments.

Alternatively in the secondary battery 30 according to the embodiments, the third oxide semiconductor layer 24 may include the nickel oxide (NiO); the hydroxide layer 22 may include a laminated structure in which both of the nickel hydroxide ($Ni(OH)_2$) and the nickel oxyhydroxide (NiOOH) are mixed, and the nickel hydroxide ($Ni(OH)_2$) may be contacted with the third oxide semiconductor layer 24, and the nickel oxyhydroxide (NiOOH) may be contacted with the second charging layer 18.

Moreover, in the secondary battery 30 according to the embodiments, the third oxide semiconductor layer 24 includes the nickel oxide (NiO); and the hydroxide layer 22 includes the nickel oxyhydroxide (NiOOH) when fully charged, and includes the nickel hydroxide ($Ni(OH)_2$) when fully discharged.

Furthermore, the nickel hydroxide ($Ni(OH)_2$) is changed to the nickel oxyhydroxide (NiOOH) at the time of the charging in which the second electrode 26 is biased to positive with respect to the first electrode 12.

Moreover, the nickel oxyhydroxide (NiOOH) is changed to the nickel hydroxide ($Ni(OH)_2$) at the time of discharging via a load connected between the first electrode 12 and the second electrode 26.

The hydroxide layer 22 may be formed as a film directly on the second charging layer 18, or may be formed by periodically applying a pulse voltage between the p type third oxide semiconductor layer 24 and the n type first oxide semiconductor layer 14, as mentioned below.

An electricity accumulation capacity can be increased by forming the nickel hydroxide ($Ni(OH)_2$) layer between the charging layer 20 (the first charging layer 16+the second charging layer 18) and the third oxide semiconductor layer 24, in the secondary battery 30 according to the embodiments.

Moreover, in the secondary battery 30 according to the embodiments, there may be adopted a configuration in which a layer containing many OH groups ($Ni(OH)_X$), $Si(OH)_X$ is formed to be inserted between the second charging layer 18 and the p type third oxide semiconductor layer 24. The electricity accumulation capacity can be enlarged by including such a configuration, and thereby battery performance can be improved. More specifically, the hydroxide layer 22 is not limited to the nickel hydroxide ($Ni(OH)_2$), but may be formed as a mixture layer, e.g., the layer containing many OH groups ($Ni(OH)_X$), $Si(OH)_X$. A compound of Ni, Si, O, H and elements which constitutes the second charging layer 18 may be contained as a structural factor.

Energy Band Diagram

Hereinafter, there will be described an example in which the p type third oxide semiconductor layer 24 is formed of the nickel oxide (NiO), the hydroxide layer 22 is formed of at least any one of the nickel hydroxide ($Ni(OH)_2$) or the nickel oxyhydroxide (NiOOH), the first charging layer 16 is formed of $SiO_2/TiO_2$, and the second charging layer 18 is formed of $SiO_2/SnO$.

Before Charging

Figures 2A, 2B:
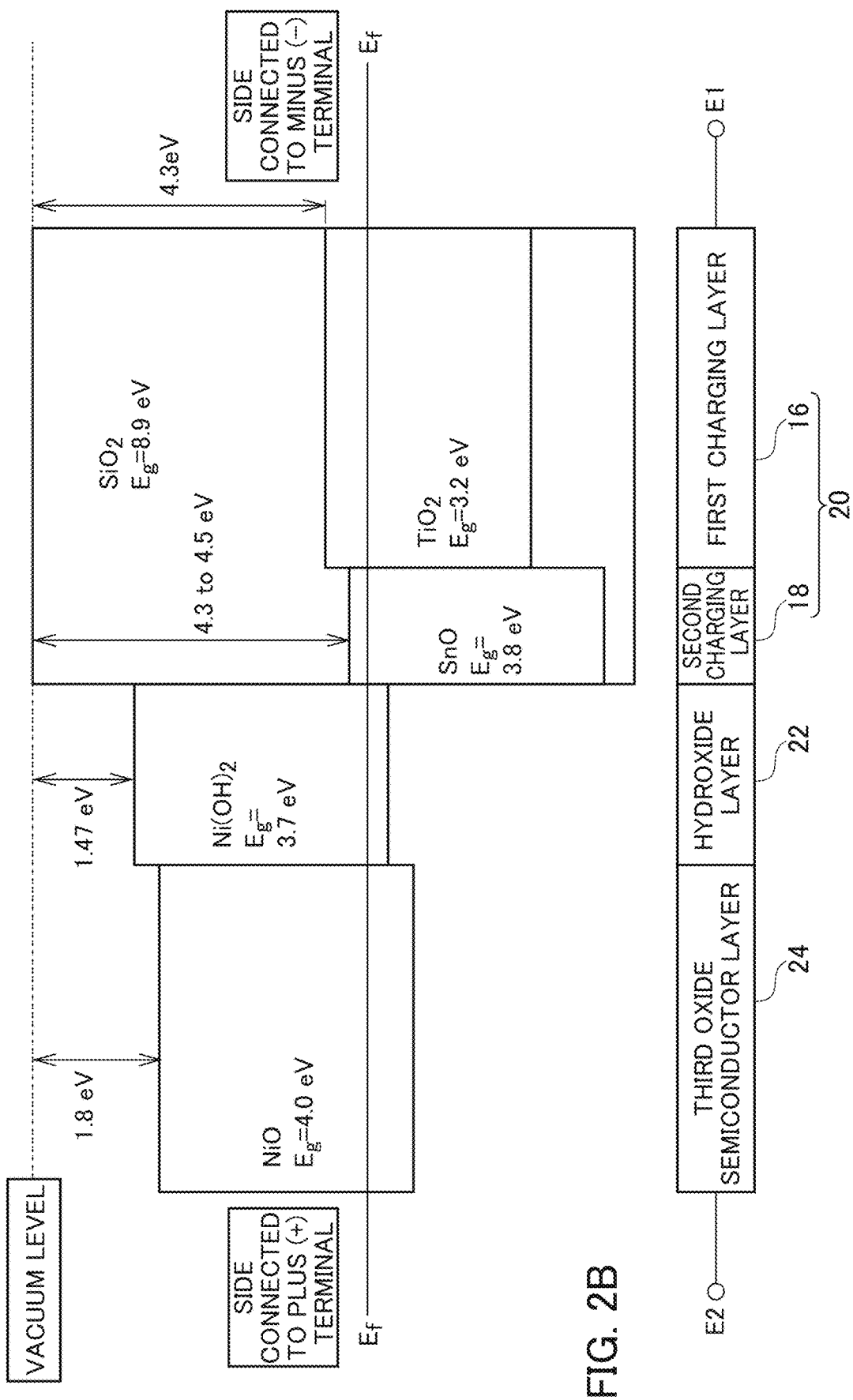
FIG. 2A shows an energy band diagram before charging of the secondary battery according to the embodiments.
FIG. 2B is a schematic configuration diagram of each layer corresponding to FIG. 2A.

FIG. 2A shows an energy band diagram before charging of the secondary battery 30 according to the embodiments, and FIG. 2B shows a schematic configuration of each layer corresponding to FIG. 2A. In the drawings, $E_f$ denotes the Fermi level.

The p type third oxide semiconductor layer 24 which is the nickel oxide (NiO) is connected to a second electrode (26) E2, and the first charging layer 16 which is $SiO_2/TiO_2$ is connected to a first electrode (12) E1.

In a thermal equilibrium state, the energy band diagram before charging of the secondary battery 30 according to the embodiments is shown, as shown in FIG. 2A, a conduction band of $NiO/Ni(OH)_2/SnO/TiO_2$ exists in a level of 1.8 eV/1.47 eV/4.3 to 4.5 eV/4.3 eV with respect to the vacuum level. Moreover, the bandgap energy $E_g$ of $NiO/Ni(OH)_2/SnO/TiO_2$ is 4.0 eV/3.7 eV/3.8 eV/3.2 eV. Moreover, the bandgap energy $E_g$ of $SiO_2$ which constitutes the charging layer 20 is 8.9 eV. Before charging, the hydroxide layer 22 is the nickel hydroxide ($Ni(OH)_2$).

During Charging (Forward Bias State)

FIG. 3A shows an energy band diagram in during charging (forward bias state) of the secondary battery 30 according to the embodiments, and FIG. 3B shows a schematic configuration of each layer corresponding to FIG. 3A.

FIG. 3A shows the energy band diagram in a state where the second electrode E2 is connected to plus (+), the first electrode E1 is connected to minus (−), and a charging voltage of, for example, approximately 2.8V is applied. In this context, the Fermi level $E_f$ in a state of applying approximately 2.8V is expressed as shown in FIG. 3A.

Since the nickel oxyhydroxide (NiOOH) is generated from the nickel hydroxide ($Ni(OH)_2$) in the hydroxide layer 22C during charging in the secondary battery 30 according to the embodiments, the hydroxide layer 22C during charging is represented by a layered structure of the nickel hydroxide ($Ni(OH)_2$)/the nickel oxyhydroxide (NiOOH), as shown in FIGS. 3A and 3B. The nickel hydroxide ($Ni(OH)_2$) layer is mainly disposed at the nickel oxide layer (NiO) side, and the nickel oxyhydroxide (NiOOH) layer is disposed at the second charging layer 18 side.

Since approximately 2.8V is applied as a positive voltage between the second electrode E2 and the first electrode E1 during charging, an electron $e^-$ is injected into the n type oxide semiconductor ($TiO_2$) of the charging layer 20 from the first electrode E1, and a hole $h^+$ is injected into the p type oxide semiconductor layer (NiO) 24 from the second electrode E2, inside the secondary battery 30.

Due to assist of water or water vapor component ($H_2O$), a reaction of $Ni(OH)_2+OH^- \rightarrow NiOOH+H_2O+e^-$ progresses at the positive electrode side, whereas a reaction of $M+H_2O+e^- \rightarrow MH+OH^-$ progresses at the negative electrode side. In this context, M denotes a metallic element in the charging layer 20.

As a result, since a reaction of $Ni(OH)_2+h^+ \rightarrow NiOOH+H^+$ progresses in the hydroxide layer 22C during the charging, hydrogen accumulation due to the assist of the water or water vapor component ($H_2O$) is realized in the charging layer 20 in accordance with the synthesis between the hydrogen ion $H^+$ and the electron $e^-$, as shown in FIG. 3A. In this case, the hydrogen H is coupled to dangling bonds of Ti, Si, etc., in the charging layer 20, in the hydrogen accumulation. It is also possible to be coupled in OH form.

Full Charge

Figure 4A:
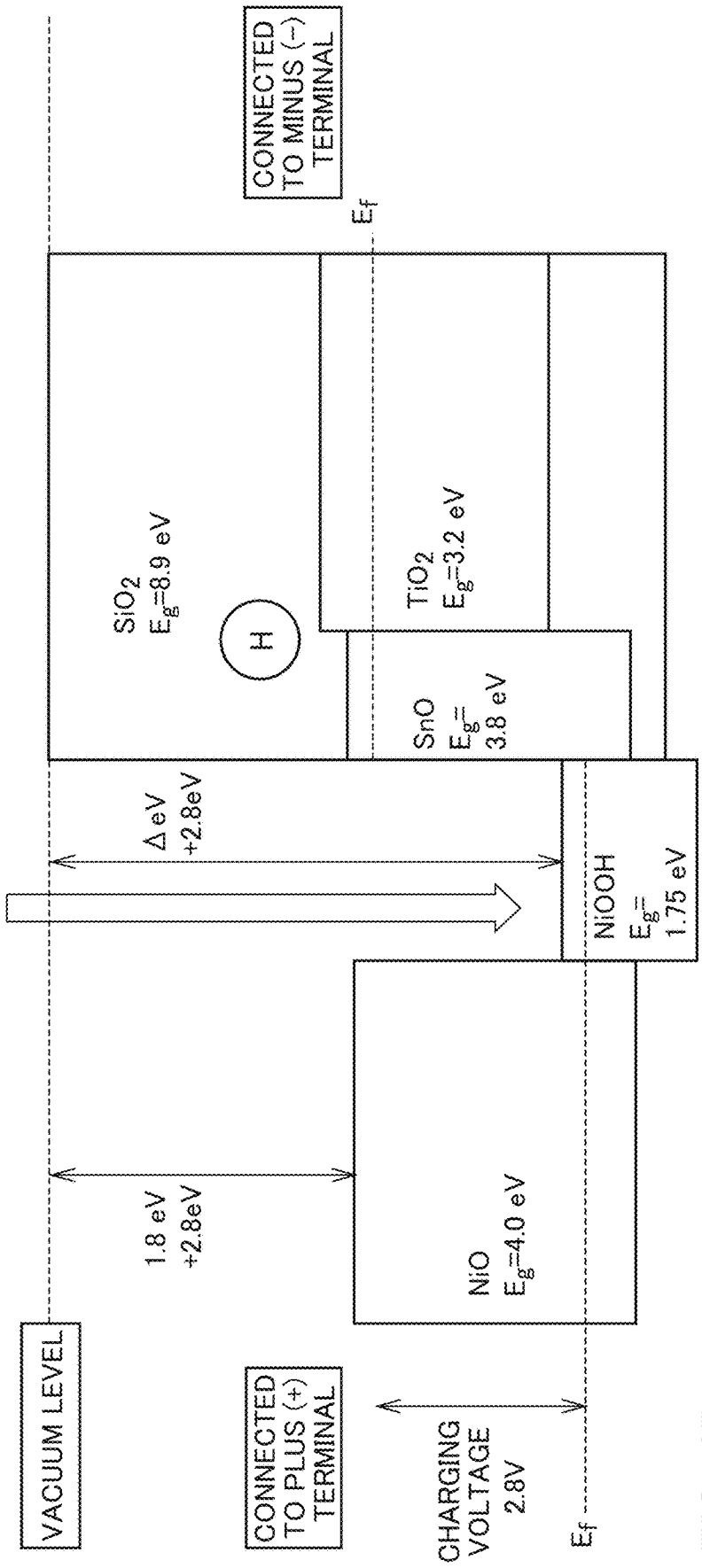
FIG. 4A shows an energy band diagram in a fully charged state of the secondary battery according to the embodiments.
Figure 4B:
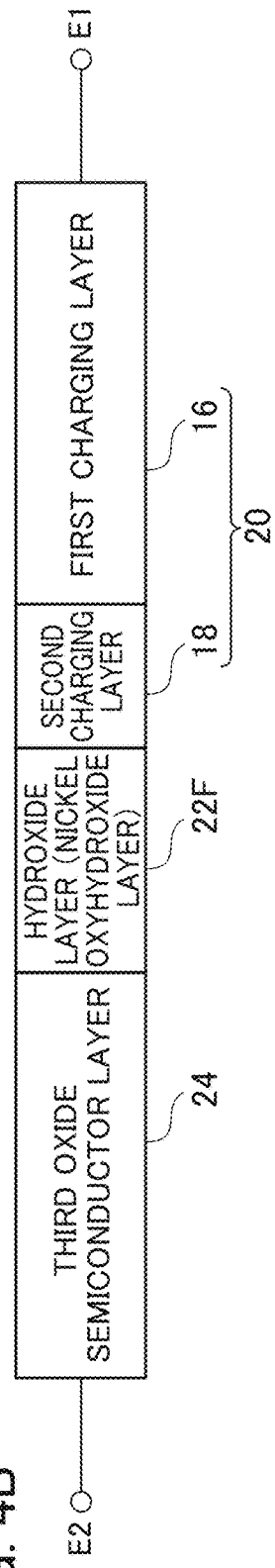
FIG. 4B is a schematic configuration diagram of each layer corresponding to FIG. 4A.

FIG. 4A shows an energy band diagram in a fully charged state of the secondary battery 30 according to the embodiments, and FIG. 4B shows a schematic configuration of each layer corresponding to FIG. 4A. A conduction band of NiO/NiOOH exists at a level of 1.8 eV+2.8 eV/ΔeV+2.8 eV with respect to the vacuum level. Moreover, the bandgap energy $E_g$ of NiOOH is 1.75 eV.

In an opened state after full charging in which fully hydrogen accumulation is performed in the charging layer 20, a holding voltage slightly lower than that at the time of the charging (2.8V) is held between the second electrode E2 and the first electrode E1.

Moreover, in the fully charged state of the secondary battery 30 according to the embodiments, the nickel hydroxide ($Ni(OH)_2$) layer 22 is changed to the nickel oxyhydroxide (NiOOH) layer 22F, and then energy accumulation as chemical potential of unstable NiOOH is performed.

During Discharging

FIG. 5A shows an energy band diagram in a discharged state (state connected to a load) of the secondary battery 30 according to the embodiments, and FIG. 5B shows a schematic configuration of each layer corresponding to FIG. 5A. More specifically, the energy band diagram in the discharged state (state connected to the load) where a load 42 is connected between the second electrode E2 and the first electrode E1 is expressed as shown in FIG. 5A. In this case, the Fermi level $E_f$ in a state of applying approximately 2.8V gradually increases in accordance with a discharged state, as shown in FIG. 5A. In the discharged state (state connected to the load) of the secondary battery 30 according to the embodiments, the reverse reaction of the above-mentioned charging operation occurs.

Since the nickel hydroxide ($Ni(OH)_2$) is generated from the nickel oxyhydroxide (NiOOH) in the hydroxide layer 22D during discharging, in the secondary battery 30 according to the embodiments, the hydroxide layer 22D during discharging is represented by a layered structure of the nickel hydroxide ($Ni(OH)_2$)/the nickel oxyhydroxide (NiOOH), as shown in FIGS. 5A and 5B. The nickel hydroxide ($Ni(OH)_2$) layer is mainly formed at the nickel oxide layer (NiO) side, and the nickel oxyhydroxide (NiOOH) layer is formed at the second charging layer 18 side.

Since the load 42 is externally connected between the second electrode E2 and the first electrode E1 during discharging, the electron $e^-$ is discharged to the first electrode E1 from the n type oxide semiconductor ($TiO_2$) of the charging layer 20, and the hole $h^+$ is discharged to the second electrode E2 from the p type oxide semiconductor layer (NiO) 24, inside the secondary battery 30.

Due to assist of water or water vapor component ($H_2O$), a reaction of $NiOOH+H_2O+e^- \rightarrow Ni(OH)_2+OH^-$ progresses at the positive electrode side, whereas a reaction of $MH+OH^- \rightarrow M+H_2O+e^-$ progresses at the negative electrode side.

As a result, since a reaction of $NiOOH+Ni(OH)^+ \rightarrow Ni(OH)_2+h^+$ progresses in the hydroxide layer 22D during the discharging, release of the hydrogen accumulation state due to the assist of the water or water vapor component ($H_2O$) is realized in the charging layer 20 in accordance with separation between the hydrogen ion $H^+$ and the electron $e^-$, as shown in FIG. 5A.

Fully Discharged State

FIG. 6A shows an energy band diagram in a fully discharged state of the secondary battery 30 according to the embodiments, and FIG. 6B shows a schematic configuration of each layer corresponding to FIG. 6A.

In the fully discharged state, the nickel oxyhydroxide (NiOOH) is changed to the nickel hydroxide ($Ni(OH)_2$) layer 22.

In the fully discharged state, the energy band diagram of the secondary battery 30 according to the embodiments is expressed as shown in FIG. 6A, and a conduction band of $NiO/Ni(OH)_2/SnO/TiO_2$ exists in a level of 1.8 eV/1.47 eV/4.3 to 4.5 eV/4.3 eV with respect to the vacuum level. Moreover, the bandgap energy $E_g$ of $NiO/Ni(OH)_2/SnO/TiO_2$ is 4.0 eV/3.7 eV/3.8 eV/3.2 eV. Moreover, the bandgap energy $E_g$ of $SiO_2$ which constitutes the charging layer 20 is 8.9 eV. In the fully discharged state, the hydroxide layer 22 is the nickel hydroxide ($Ni(OH)_2$).

In the fully discharged state, it has recovered to a state equivalent to the above-mentioned thermal equilibrium state before the charging.

Fabrication Method

A fabrication method of the secondary battery 30 according to the embodiments includes: forming a first oxide semiconductor 14 having a first conductivity type; forming a first charging layer 16 composed by including a first insulating material and a second oxide semiconductor having the first conductivity type on the first oxide semiconductor layer 14; forming a second charging layer 18 on the first charging layer 16; forming a third oxide semiconductor layer 24 having a second conductivity type on the second charging layer 18; and forming a hydroxide layer 22 containing a hydroxide of a metal constituting the third oxide semiconductor layer 24 between the first charging layer 16 and the third oxide semiconductor layer 24.

n Type Oxide Semiconductor Layer 14

A $TiO_2$ layer is formed as a film on the first electrode 12 which constitutes a lower electrode, for example by a sputtering deposition method. In this case, Ti or TiO can be used as a target. The layer thickness of the n type oxide semiconductor layer 14 is approximately 50 nm to approximately 200 nm, for example. A tungsten (W) electrode or the like can be applied to the first electrode 12, for example.

First Charging Layer 16

A chemical solution is formed by stirring titanium fatty acid and silicone oil with a solvent. The aforementioned chemical solution is coated on the n type oxide semiconductor layer 14 by means of a spin coater. The rotational frequency thereof is approximately 500 to approximately 3000 rpm. It is dried on a hot plate after the coating. The drying temperature on the hot plate is approximately 30° C. to approximately 200° C., for example, and the drying time thereon is approximately 5 minutes to approximately 30 minutes, for example. It is fired after the drying. In the firing performed after the drying, it is fired in the atmosphere using a baking furnace. The firing temperature is approximately 300° C. to approximately 600° C., and the firing time is approximately 10 minutes to approximately 60 minutes.

Consequently, aliphatic acid salt is decomposed and then a fine particle layer of a titanium dioxide covered with a silicone insulating film is formed. The above-mentioned fabrication (preparation) method of forming the titanium dioxide layer covered with the silicone insulating film is a coating and thermodecomposition method. More specifically, the aforementioned layer has a structure where a metallic salt of the titanium dioxide coated with silicone is embedded in the silicone layer. After the firing, UV irradiation by means of a low pressure mercury lamp is implemented. The UV irradiation time is approximately 10 minutes to approximately 100 minutes.

Second Charging Layer (Buffer Layer) 18 (Method 1)

A chemical solution is formed by stirring tin fatty acid and silicone oil with a solvent. The aforementioned chemical solution is coated on the first charging layer 16 by means of the spin coater. The rotational frequency thereof is approximately 500 to approximately 3000 rpm. It is dried on a hot plate after the coating. The drying temperature on the hot plate is approximately 30° C. to approximately 200° C., for example, and the drying time thereon is approximately 5 minutes to approximately 30 minutes, for example. Furthermore, it is fired after the drying. In the firing performed after the drying, it is fired in the atmosphere using a baking furnace. The firing temperature is approximately 300° C. to approximately 600° C., and the firing time is approximately 10 minutes to approximately 60 minutes. After the firing, UV irradiation by means of a low pressure mercury lamp is implemented. The UV irradiation time is approximately 10 minutes to approximately 100 minutes. The layer thickness of the second charging layer (buffer layer) 18 after the UV irradiation is approximately 100 nm to approximately 300 nm, for example.

Second Charging Layer (Buffer Layer) 18 (Method 2)

A chemical solution is formed by stirring silicone oil with a solvent. The aforementioned chemical solution is coated on the first charging layer 16 by means of the spin coater. The rotational frequency thereof is approximately 500 to approximately 3000 rpm. It is dried on a hot plate after the coating. The drying temperature on the hot plate is approximately 50° C. to approximately 200° C., for example, and the drying time thereon is approximately 5 minutes to approximately 30 minutes, for example. Furthermore, it is fired after the drying. In the firing performed after the drying, it is fired in the atmosphere using a baking furnace. The firing temperature is approximately 300° C. to approximately 600° C., and the firing time is approximately 10 minutes to approximately 60 minutes. After the firing, UV irradiation by means of a low pressure mercury lamp is implemented. The UV irradiation time is approximately 10 minutes to approximately 60 minutes. The layer thickness of the second charging layer (buffer layer) 18 after the UV irradiation is approximately 10 nm to approximately 100 nm, for example.

p type Third Oxide Semiconductor Layer 24

A NiO layer is formed as a film on the second charging layer 18, for example by a sputtering deposition method. In this case, Ni or NiO can be used as a target. The layer thickness of the p type oxide semiconductor layer 24 is approximately 200 nm to approximately 1000 nm, for example.

Second Electrode 26

The second electrode 26 as an upper electrode is formed by forming Al as a film by means of a sputtering deposition method or a vacuum evaporation method, for example. The second electrode 26 can be formed on the p type third oxide semiconductor layer (NiO) 24 using Al target. The second electrode 26 may be formed only on a specified region using a stainless steel mask, for example.

$Ni(OH)_2$

It is formed through an electrical stimulation process which performs an electrical treatment after the formation of the second electrode 26.

Plus and negative voltages are alternately applied to the second electrode 26, using the first electrode 12 as a ground (earth) potential. An atmosphere is the atmospheric air and humidity is approximately 20% to approximately 60%, for example.

Figure 7A:
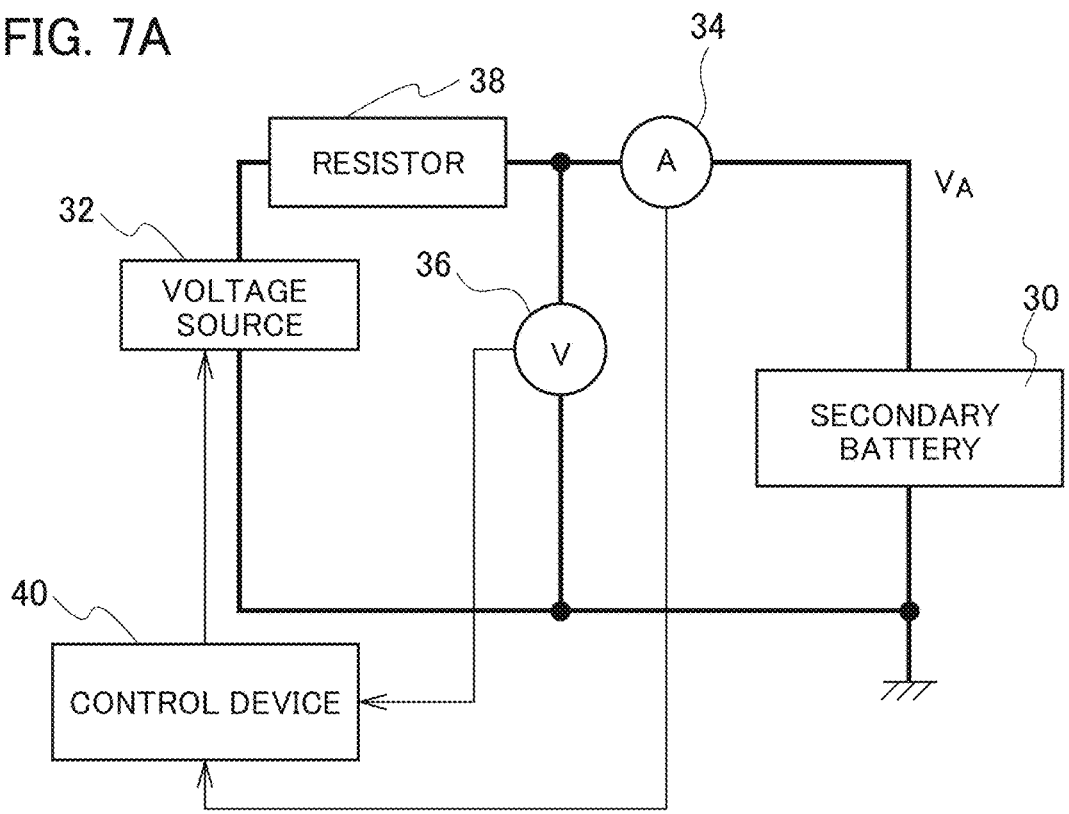
FIG. 7A is a schematic circuit configuration diagram showing a control system to be applied to an electrical stimulation process of forming a hydroxide layer between a first charging layer and a third oxide semiconductor layer in the secondary battery according to the embodiments.
Figure 7B:
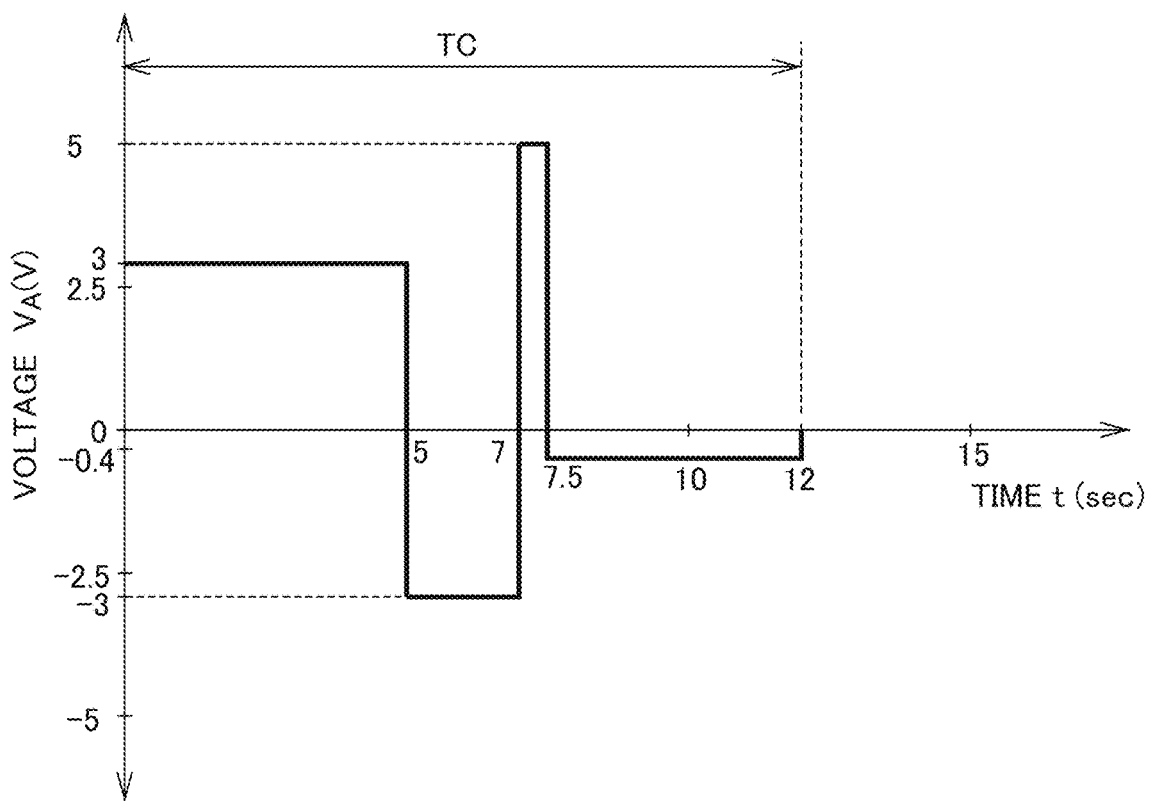
FIG. 7B shows a waveform example of a pulse voltage VA to be applied between a first electrode and a second electrode.

FIG. 7A shows a schematic circuit configuration of a control system to be applied to the electrical stimulation process for forming a hydroxide layer between the charging layer 20 and the third oxide semiconductor layer 24, in the secondary battery 30 according to the embodiments. FIG. 7B shows a waveform example of a pulse voltage $V_A$ to be applied between the first electrode 12 and the second electrode 26. In FIG. 7A, a connecting relationship between the circuits is expressed by the thick line and a signal flow is expressed by the thin line.

As shown in FIG. 7A, the pulse voltage $V_A$ to be applied to the second electrode 26 of the secondary battery 30 with which the first electrode 12 is grounded (earthed) is supplied from a voltage source 32 through an ammeter 34, a voltmeter 36, and a resistor 38. The voltage source 32 can be controlled by the control device 40. Moreover, since a value of the ammeter 34 and a value of the voltmeter 36 are fed back to the control device 40, the pulse voltage $V_A$ shown in FIG. 7B can be supplied from the voltage source 32 controlled by the control device 40.

As shown in FIG. 7B, one cycle TC is set to 3V (5 seconds)→−3V (2 seconds)→5V (0.5 seconds)→−0.4V (4.5 seconds), for example, and the pulse voltage $V_A$ is applied thereto in approximately 300 to approximately 5000 cycles. Thereby, the $Ni(OH)_2$ layer 22 can be formed between the second charging layer 18 and the third oxide semiconductor layer (NiO) 24. In addition, it is detected from a measured result of a Secondary Ion Mass Spectroscopy (SIMS) that substances containing Si, O, H, and Ni also exists in the $Ni(OH)_2$ layer 22.

Also in a structure including only the first charging layer 16 and not including the second charging layer 18 as the charging layer 20, the hydroxide layer can be formed between the first charging layer 16 and the third oxide semiconductor layer 24 through the above-mentioned electrical stimulation process.

The pulse voltage waveform shown in FIG. 7B is merely one example, and the voltage, the number of pulses per cycle, the order of the positive/negative voltages, and the like can be appropriately selected in accordance with the configuration of the secondary battery 30. It is also possible to select a pulse waveform applying of no negative voltage.

Relationship between Energy Density and Electrical Stimulation Time

Figure 8:
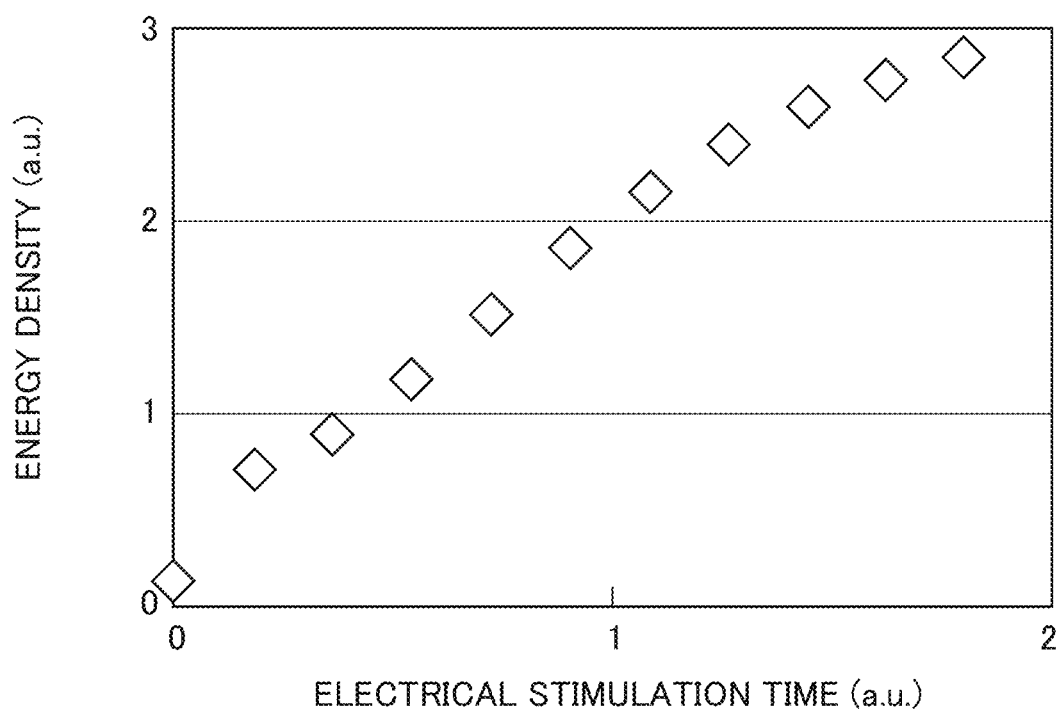
FIG. 8 is a diagram showing an experimental result of a relationship between an energy density and an electrical stimulation time in the secondary battery according to the embodiments.

FIG. 8 shows an experimental result of a relationship between an energy density and an electrical stimulation time, in the secondary battery 30 according to the embodiments. In the embodiments, the electrical stimulation time corresponds to a time period of applying the pulse voltage $V_A$ of one cycle TC=12 seconds for a plurality of the cycles.

As shown in FIG. 8, there is a tendency that the energy density increases as the electrical stimulation time increases. It is confirmed that the layer thickness of the hydroxide $(Ni(OH)_x)$ layer 22 increases with elapsing of the electrical stimulation time.

In embodiments, the nickel hydroxide $(Ni(OH)_2)$ layer 22 is formed between the charging layer 20 and the third oxide semiconductor layer (NiO) 24. As a result, since the reaction of $Ni(OH)_2+h^+ \rightarrow NiOOH+H^+$ progresses at the time of charging, and the reaction of $NiOOH+Ni(OH)_2+H^+ \rightarrow Ni(OH)_2+h^+$ progresses at the time of discharging, there can be provided the secondary battery 30 with the increased electricity accumulation capacity.

Experimental Results

Figure 9:
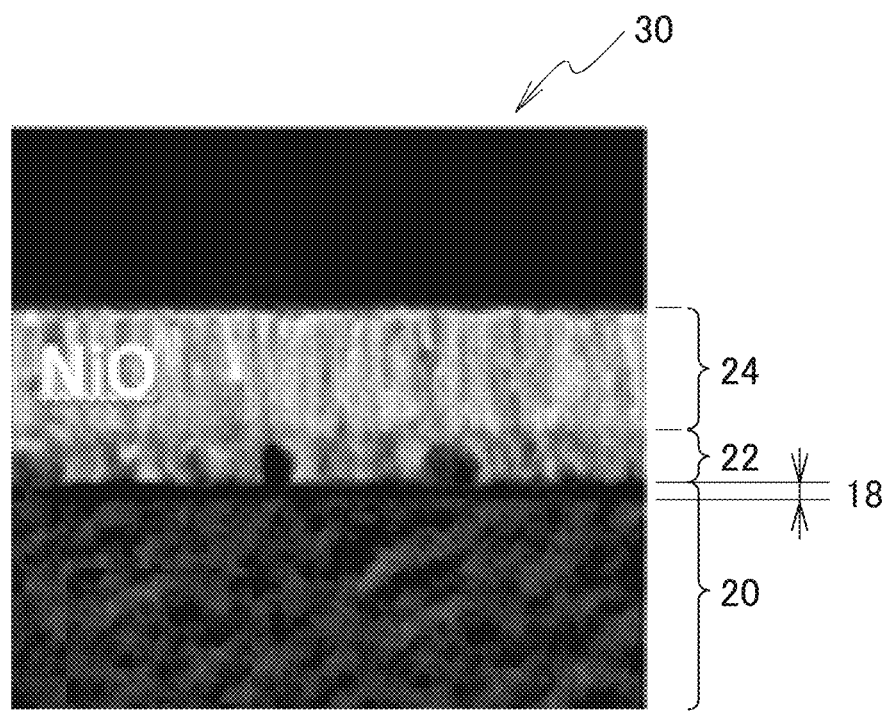
FIG. 9 shows an example of a scanning electron microscope (SEM) photograph of a cross section of a sample in which a second charging layer is formed by using silicone oil, in the secondary battery according to the embodiments.

FIG. 9 shows an example of a cross section SEM photograph of a sample in which the second charging layer 18 is made only using silicone oil and is subjected to the electrical stimulation process, in the secondary battery 30 according to the embodiments.

The hydroxide $(Ni(OH)_2)$ layer 22 is clearly formed between the second charging layer (buffer layer) 18 and the third oxide semiconductor layer (NiO) 24 which are formed only of silicone oil.

SIMS Analysis

In the secondary battery 30 according to the embodiments shown in FIG. 9, mass spectrometry of each element is implemented by digging from a front side surface of the third oxide semiconductor layer (NiO) 24 to obtain an SIMS profile for each element.

Figure 10:
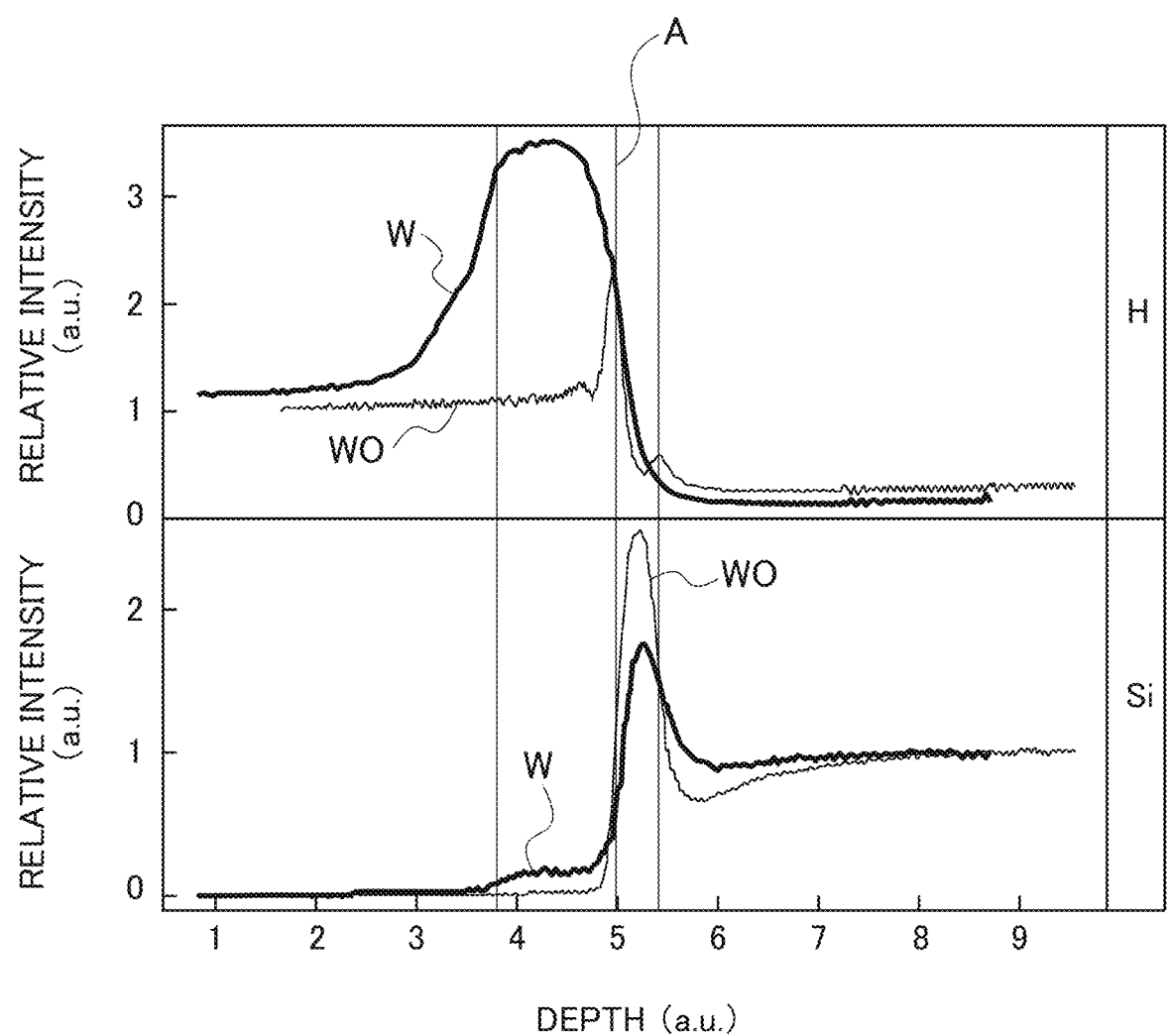
FIG. 10 shows an example of an SIMS profile for each element, in the secondary battery according to the embodiments shown in FIG. 9.

In the sample not subjected to the electrical stimulation process (curved line WO in FIG. 10), a region having a peak of Si near the depth 5 (a.u.) corresponds to the second charging layer (buffer layer) 18 made by only using the silicone oil. A peak of H is observed at an interface between the buffer layer 18 and the third oxide semiconductor layer (NiO) 24 (a portion of which the depth is the vertical line A).

On the other hand, in a sample which subjected to the electrical stimulation process (the curved line W in FIG. 10), there is a region with a large amount of H in a depth portion on the left-hand side of the vertical line A, and therefore it is estimated it is due to the presence of the hydroxide $(Ni(OH)_2)$ layer 22.

The hydroxide $(Ni(OH)_2)$ layer 22 is a layer electrochemically formed through the electrical stimulation process. Therefore, there is also introduction of Si from $SiO_X$ of the underlying second charging layer (buffer layer) 18, and the presence of Si can be confirmed also from the SIMS profile (the curved line W in FIG. 10).

Figure 11:
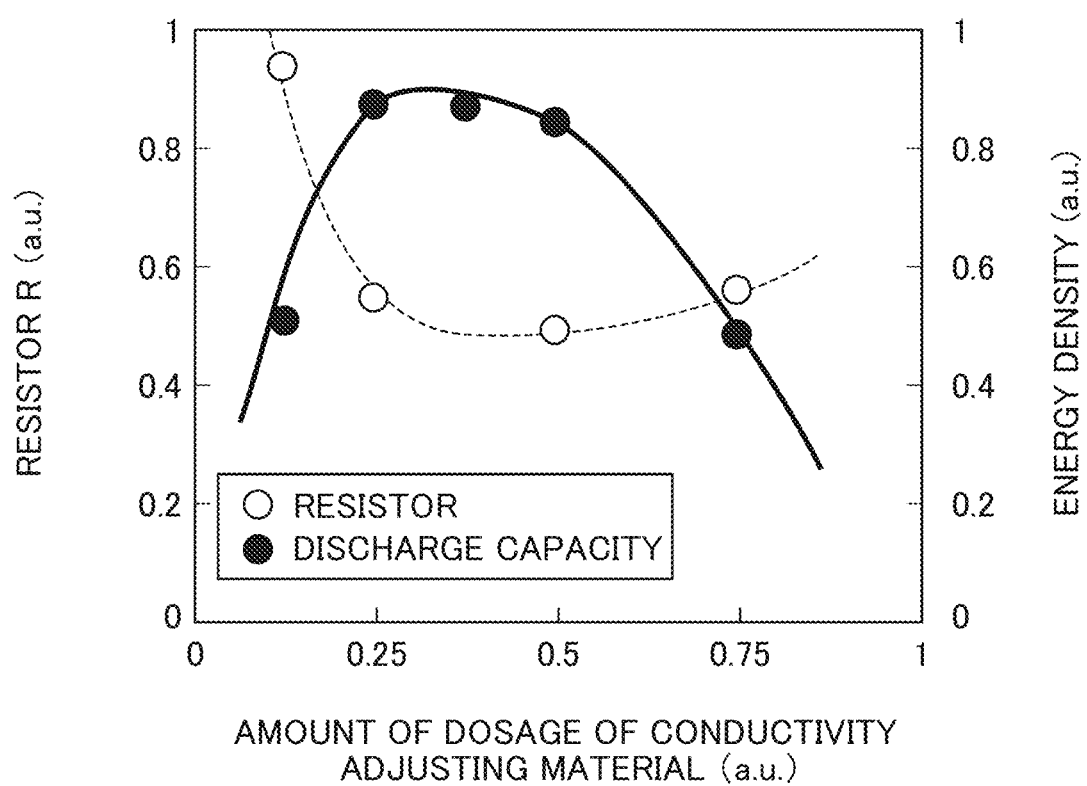
FIG. 11 is a diagram showing a relationship of a resistor R between the first electrode and the second electrode and an energy density (a.u.) with respect to an amount of dosage of a conductivity adjusting material (a.u.), in the secondary battery according to the embodiments.

FIG. 11 shows a relationship of the resistor R between the first electrode and the second electrode and an energy density (a.u.) with respect to an amount of dosage of a conductivity adjusting material (a.u.), in the secondary battery 30 according to the embodiments. The energy density (a. u.) corresponds to the discharge capacity of the secondary battery 30.

In FIG. 11, the amount of dosage of conductivity adjusting material corresponds to a value related to an additive amount of $SnO_X$ in the second charging layer (buffer layer) 18. As shown in FIG. 11, the optimum values of the resistor R between the first electrode and the second electrode (a.u.) and the energy density (a.u.) exist with respect to the value related to the additive amount of $SnO_X$ in the second charging layer 18.

In the secondary battery 30 according to the embodiments, the second charging layer (buffer layer) 18 composed by including the insulating material and the conductivity adjusting material can be optimize the energy density by controlling the additive amount of the conductivity adjusting material.

Laminated Structure

For example, a structure of the secondary battery 30 according to the embodiments is made in a sheet shape by using stainless steel foil as a substrate. Subsequently, this sheet may be laminated to produce the secondary battery 30 with a required capacity.

For example, a secondary battery with a required capacity can be manufactured by opposing two sheets of the second electrodes (upper electrodes), inserting an electrode (thin metal foil) therebetween, and laminating the two sheets in multiple layers. It may be sealed with a laminate or the like after the laminating.

Other Embodiments

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments, whether described or not.

INDUSTRIAL APPLICABILITY

The secondary battery of the embodiments can be utilized for various consumer equipment and industrial equipment, and can be applied to wide applicable fields, such as secondary batteries for system applications capable of transmitting various kinds of sensor information with low power consumption, e.g. communication terminals and secondary batteries for wireless sensor networks.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A secondary battery comprising:
   a first oxide semiconductor having a first conductivity type;
   a first charging layer disposed on the first oxide semiconductor layer, the first charging layer composed by comprising a first insulating material and a second oxide semiconductor, the second oxide semiconductor having the first conductivity type;
   a third oxide semiconductor layer having a second conductivity type disposed on the first charging layer; and
   a hydroxide layer disposed between the first charging layer and the third oxide semiconductor layer, the hydroxide layer containing a hydroxide of a metal constituting the third oxide semiconductor layer.

2. The secondary battery according to claim 1, further comprising:
   a second charging layer disposed between the first charging layer and the hydroxide layer.

3. The secondary battery according to claim 2, wherein the second charging layer comprises a second insulating material.

4. The secondary battery according to claim 2, wherein the second charging layer comprises a second insulating material and a conductivity adjusting material.

5. The secondary battery according to claim 4, wherein the conductivity adjusting material comprises an oxide of a semiconductor having the first conductivity type or an oxide of a metal.

6. The secondary battery according to claim 4, wherein the conductivity adjusting material comprises at least one oxide selected from the group of consisting of an oxide of Sn, an oxide of Zn, an oxide of Ti, and an oxide of Nb.

7. The secondary battery according to claim 4, wherein the second insulating material comprises $SiO_2$, and the conductivity adjusting material comprises $SnO_x$.

8. The secondary battery according to claim 4, wherein the second insulating material comprises $SiO_x$ formed as a film from silicone oil.

9. The secondary battery according to claim 4, wherein an energy density is adjusted by controlling an additive amount of the conductivity adjusting material.

10. The secondary battery according to claim 2, wherein:
the third oxide semiconductor layer comprises nickel oxide (NiO); and
the hydroxide layer comprises a laminated structure in which both of nickel hydroxide ($Ni(OH)_2$) and nickel oxyhydroxide (NiOOH) are mixed, and the nickel hydroxide ($Ni(OH)_2$) is contacted with the third oxide semiconductor layer, and the nickel oxyhydroxide (NiOOH) is contacted with the second charging layer.

11. The secondary battery according to claim 2, wherein:
the first charging layer is a layer that accumulates hydrogen generated at the time of charging; and
the second charging layer is a buffer layer for adjusting movement of $H^+$ and electrons ($e^-$).

12. The secondary battery according to claim 1, wherein the first charging layer comprises a porous structure.

13. The secondary battery according to claim 1, wherein the second oxide semiconductor comprises at least one oxide selected from the group consisting of an oxide of Ti, an oxide of Sn, an oxide of Zn, and an oxide of Mg.

14. The secondary battery according to claim 1, wherein the first insulating material comprises $SiO_2$, and the second oxide semiconductor comprises $TiO_2$.

15. The secondary battery according to claim 1, wherein the third oxide semiconductor layer comprises nickel oxide (NiO), and
the hydroxide layer comprises at least any one of nickel hydroxide ($Ni(OH)_2$) or nickel oxyhydroxide (NiOOH).

16. The secondary battery according to claim 15, wherein:
the third oxide semiconductor layer comprises nickel oxide (NiO); and
the hydroxide layer comprises the nickel oxyhydroxide (NiOOH) when fully charged, and comprises the nickel hydroxide ($Ni(OH)_2$) when fully discharged.

17. The secondary battery according to claim 15, wherein the nickel hydroxide ($Ni(OH)_2$) is changed to the nickel oxyhydroxide (NiOOH) at a time of charging.

18. The secondary battery according to claim 15, wherein the nickel oxyhydroxide (NiOOH) is changed to the nickel hydroxide ($Ni(OH)_2$) at a time of discharging.

19. The secondary battery according to claim 1, wherein the hydroxide layer is formed by periodically applying a pulse voltage between the third oxide semiconductor layer and the first oxide semiconductor layer.

* * * * *